(12) United States Patent
Manfredotti

(10) Patent No.: US 8,282,085 B2
(45) Date of Patent: Oct. 9, 2012

(54) ABSORBENT COVERING

(75) Inventor: Thomas Manfredotti, La Colle sur Loup (FR)

(73) Assignee: Eurocopter, Marignane Cedex (FR)

( * ) Notice: Subject to any disclaimer, the term of this patent is extended or adjusted under 35 U.S.C. 154(b) by 1102 days.

(21) Appl. No.: 11/953,171

(22) Filed: Dec. 10, 2007

(65) Prior Publication Data

US 2008/0145621 A1    Jun. 19, 2008

(30) Foreign Application Priority Data

Dec. 11, 2006    (FR) ...................................... 06 10783

(51) Int. Cl.
*F16M 9/00*    (2006.01)

(52) U.S. Cl. ............. 267/136; 267/35; 267/70; 267/141; 267/152; 267/292; 52/783.1; 428/137; 428/178; 428/311.71; 428/315.9

(58) Field of Classification Search .................. 268/178, 268/136, 292, 141, 8–81, 148, 160–163, 268/181; 428/137, 99, 178, 72–74, 117, 428/166–168; 604/385.01; *B32B 3/06, 3/10, B32B 3/12; F16M 13/00*
See application file for complete search history.

(56) References Cited

U.S. PATENT DOCUMENTS

| 3,509,963 | A | * | 5/1970 | Deplante ........................ 181/207 |
| 4,259,385 | A | | 3/1981 | Keller |
| 4,353,433 | A | | 10/1982 | Mohrenstein-Ertel et al. |
| 5,360,129 | A | * | 11/1994 | Lee ................................. 220/1.5 |
| 7,553,533 | B2 | | 6/2009 | Manfredotti |
| 2006/0246257 | A1 | * | 11/2006 | Manfredotti .................. 428/137 |
| 2006/0272279 | A1 | * | 12/2006 | Palumbo et al. ............. 52/783.1 |

FOREIGN PATENT DOCUMENTS

| DE | 4117740 C1 | 7/1992 |
| FR | 2807308 A1 | 10/2001 |
| GB | 2070728 A | 9/1981 |
| JP | 274639 U | 6/1990 |
| WO | 0243047 A1 | 5/2002 |
| WO | 2005121596 A1 | 12/2005 |

* cited by examiner

*Primary Examiner* — Robert A Siconolfi
*Assistant Examiner* — San Aung
(74) *Attorney, Agent, or Firm* — Brooks Kushman P.C.

(57) ABSTRACT

An absorbent covering (1) has high damping power, secured on a structure (2) and includes a dissipater mesh made up of a plurality of dissipating elements (3) and of nodes (4) each having its bottom end (4') secured on the structure (2). In remarkable manner, the bottom ends (4') of the nodes (4) project from the dissipating elements (3) so as to leave an empty space (5) between the dissipating elements (3) and the structure (2), the absorbent covering (1) including main absorbent elements (6) arranged in the empty space (5), each of the main absorbent elements (6) being secured firstly to a bottom face (3') of a dissipating element (3) and secondly to the structure (2).

22 Claims, 1 Drawing Sheet

ABSORBENT COVERING

The present invention relates to an absorbent covering serving to reduce or even to eliminate the dynamic deformation of a structure as generated by vibration or by impacts, for example.

BACKGROUND OF THE INVENTION

More particularly, the absorbent covering of the invention is preferably for mounting on board a rotorcraft. On being installed in particular on the walls of the cabin, the absorbent covering attenuates the dynamic deformation thereof so as to increase wall lifetime and reduce noise inside the cabin.

Naturally, the invention is not limited to this particular application, and it can be used for any other application whenever it is desired to reduce the dynamic deformation of a body. By its design, it is possible to consider using the absorbent covering on the walls of a washing machine, for example, since that type of electrical household appliance is subjected to high levels of vibration.

A first known system is constituted by a one-piece elastomer plate arranged on the structure. The damping power of the elastomer diminishes the dynamic deformation of the structure, regardless of the manner in which the structure is stressed mechanically, in particular by dissipating energy in the form of heat.

Nevertheless, the effectiveness of that first system is limited since the oscillation of the structure leads to small movements only in the elastomer. Thus, energy dissipation in the elastomer plate is low.

To improve that first system, it is common practice to use a second system. The second system comprises a visco-constraint elastomer, i.e. an elastomer plate having its top portion previously bonded onto a metal support. The bottom portion of the elastomer plate, opposite from the top portion, is then secured on a structure.

During dynamic deformation, e.g. bending of the structure generated by vibration, the top face is held by the metal support. This condition providing additional limits induces a state of internal stresses within the elastomer that is greater than in the preceding circumstances. Consequently, the amount of vibrational energy that is dissipated in the elastomer plate is increased.

The second system does indeed present better efficiency than the first system. Nevertheless, for applications that require large amounts of vibrational energy to be dissipated, it is still found to be insufficient.

Document FR 2 870 308 discloses a third damper system.

The absorbent covering secured on a structure is provided with an absorbent layer of elastic material that includes a dissipater mesh pattern. That mesh pattern, arranged in the elastic material, is constituted by a plurality of nodes and of dissipater elements.

The amount of energy dissipated in the absorbent layer is large since the elastic material of the absorbent layer is deformed firstly by a lever arm effect caused by the nodes that hold the dissipater elements away from the structure, and secondly by the dissipater elements that take the stresses transmitted by the nodes and spread them throughout the elastic material, while also amplifying the stresses by a geometrical effect.

That system is very effective, but the absorbent layer represents a mass that is not negligible and that can be troublesome in particular applications.

OBJECTS AND SUMMARY OF THE INVENTION

An object of the present invention is to provide an absorbent covering or coating that is relatively light, enabling dynamic deformations of a structure to be damped considerably.

According to the invention, an absorbent covering which presents high damping power and which is secured on a structure, comprises a dissipater mesh pattern constituted by a plurality of dissipater or dissipating elements and of nodes, each node having a bottom end that is secured on the structure. The covering is remarkable in that the bottom ends of the nodes project relative to the dissipating elements so as to create an empty space between the dissipating elements and the structure, and the absorbent covering is provided with main absorbent elements arranged in said empty space, these main absorbent elements being secured firstly to bottom faces of the dissipating elements, and secondly to the structure.

Industrial manufacture of the dissipating mesh pattern is made much easier when the mesh, and consequently the nodes and the dissipating elements, is machined or molded as a single piece constituting a single block of deformable material, e.g. of plastics material.

Similarly, in order to facilitate mounting the absorbent covering on a structure, the contact surfaces at the bottom ends of the nodes, i.e. the surfaces that come into contact with the structure, are preferably covered with a self-adhesive material.

The dissipating elements are then spaced apart from the structure being secured thereto solely via the nodes.

Thus, dynamic deformation of the structure entrains differential movements of the nodes. The dissipating elements are then stressed, which has the effect of modifying their shape.

In this way, the amount of energy dissipation as such within the main absorbent elements is large, since these elements are stressed by shear forces that are considerable.

The main absorbent elements are subjected to the effects of the structure deforming, firstly directly through the interface between the structure and the main absorbent elements, and secondly at the interface between the main absorbent elements and the dissipating elements in indirect manner via the movement of the dissipating elements, itself accentuated by a lever arm effect produced by the nodes that support the dissipating elements.

The dissipating elements thus amplify the deformations of the structure and transmit the amplified deformations to the main absorbent elements. Consequently, these main absorbent elements are stressed by the structure and by the dissipating elements, thereby optimizing their action.

By being stressed, the main absorbent elements thus damp the deformation to which the structure is initially subjected. Similarly, the dissipating elements participate actively in said damping by stressing the main absorbent elements when the structure deforms.

Advantageously, the dissipating elements are rigid and made of a material forming part of the group of materials comprising plastics materials. The dissipating elements are then dimensioned so as to be used in their elastic deformation range so as to ensure they are not liable to break.

In contrast, the main absorbent elements are elastic and made of a material that forms part of the group of materials comprising elastomers. The main absorbent elements have high capacity for absorbing energy, e.g. vibratory energy, compared with the dissipating elements. Consequently, the main absorbent elements have a large loss angle of at least 10°, where loss angle is well known to the person skilled in the art and is a measure of the energy a material can absorb.

Energy dissipation in the main absorbent elements is then maximized, thereby giving the covering damping power that is not negligible. Furthermore, the amount of elastic material that performs damping is minimized, thereby correspondingly lightening the covering.

For this purpose, the dissipating elements and the main absorbent elements are identical in shape, each dissipating element covering a main absorbent element over its entire length.

Furthermore, in order possibly to increase the damping power of the covering, the stresses transmitted by the dissipating elements to the main absorbent elements are amplified by a geometrical effect. At least one dissipating element is then advantageously has the shape of a dissipater ellipse, each ellipse being connected to two nodes that are disposed at the points of intersection between the periphery of the ellipse and its major axis. A small amount of deformation of an ellipse along its major axis leads to a larger amount of deformation along its minor axis. The forces dissipated in the main absorbent elements secured to such a dissipater element of elliptical shape are thus maximized.

In this configuration, the ideal is to obtain a covering made up of a plurality of absorbent ellipses acting as main absorbent elements, each absorbent ellipse being covered by a dissipater ellipse acting as a dissipating element. The absorbent and dissipater ellipses are then preferably identical in shape, with the major and minor axes of each absorbent ellipse being covered by the major and minor axes of a dissipater ellipse.

In a first embodiment, the dissipater mesh has a repeated square pattern, i.e. a pattern possessing four nodes and five dissipating elements.

In a second embodiment, the dissipater mesh has a repeated triangle pattern provided with three nodes and three dissipating elements.

Advantageously, in the second embodiment, the dissipater mesh comprises a plurality of triangular portions each made up of three half-ellipses interconnected by three node fractions, a half-ellipse corresponding to an element of elliptical shape cut in half along its, major axis. It suffices to place a plurality of triangular portions side by side in order to build up the dissipater mesh. This construction of dissipater mesh then constitutes an effective alternative to molding of or machining a single piece.

Each half-ellipse of a triangular portion preferably presents a concave side on the outside of the triangular portion.

Similarly, the mesh is optimized if each node fraction corresponds to one-sixth of a node, the node fraction occupying a sector of 60°. More precisely, the fraction corresponds to a cylinder cut axially in order to occupy no more than a 60° sector.

In a variant of these embodiments, the absorbent covering includes secondary absorbent elements, each secondary absorbent element being arranged on top of a dissipater element so as to cover its entire length. Each secondary absorbent element is preferably identical in shape to the dissipating element it covers. In addition, each secondary absorbent element is secured to a top face of a dissipating element, said top face being opposite from the bottom face thereof that is secured to a main absorbent element.

The secondary absorbent element, e.g. made of elastomer, serves to improve energy dissipation. The deformation of a dissipating element, produced by the movement of the associated nodes, generates forces in the secondary absorbent element that covers it. The effectiveness of the covering is increased thereby.

Finally, in order to optimize the covering fully, each secondary absorbent element is subjected to viscous constraint. Consequently, the covering of the invention includes a rigid cover plate, the secondary absorbent element then being arranged between the dissipating elements and said rigid cover plate.

BRIEF DESCRIPTION OF THE DRAWINGS

The invention and its advantages appear in greater detail from the following description of embodiments given by way of illustration and with reference to the accompanying figures, in which.

Elements that are present in a plurality of distinct figures are given the same references in each of them.

MORE DETAILED DESCRIPTION

Figure 1:
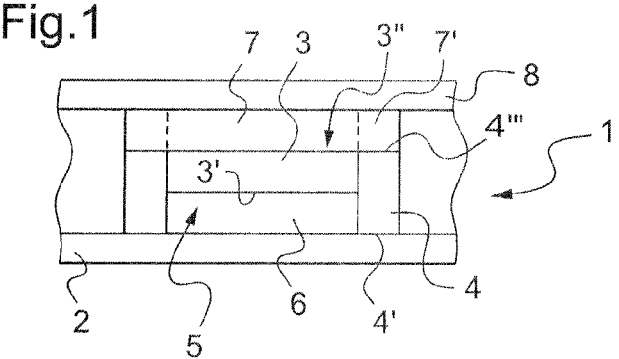
FIG. 1 is a fragmentary section of a structure provided with an absorbent covering or coating.

FIG. 1 is a section of an absorbent covering 1 of the invention arranged on a structure 2.

The absorbent covering 1 comprises a dissipater mesh pattern having a plurality of dissipater or dissipating elements 3 and of nodes 4, both made of a rigid material selected from the group constituted by plastics material, for example.

A dissipating element 3 is then secured to two nodes that are disposed at its free ends. In addition, the bottoms ends 4' of the nodes 4 project from the dissipating elements and are secured to the structure 2. To facilitate assembly, the contact surfaces of these bottom ends 4' are covered in a self-adhesive material.

Consequently, the dissipating elements 3 are spaced apart from the structure 2, with an empty space 5 thus being created between the structure 2 and each dissipating element 3. The absorbent covering 1 is then provided with a plurality of main absorbent elements 6, each main absorbent element 6 being arranged in an empty space 5 and being secured firstly to the structure 2 and secondly to the bottom face 3' of a dissipater element 3.

These main absorbent elements 6 are elastic and are selected, for example, from the group of materials comprising elastomers. Consequently, these main absorbent elements present a large loss angle, of at least 10°.

When the structure 2 deforms, e.g. as a result of vibration, the nodes 4 of the dissipater mesh move. Consequently, the dissipating elements 3 also deform, since they are relatively rigid in comparison with the absorbent elements. It should be observed that the movement of the nodes is amplified by a lever arm effect associated with their height. If the structure 2 curves, then the distance between the bottom ends 4' of the nodes 4 becomes less than or greater than the distance between their top ends 4" connected to a dissipating element 3. This phenomenon thus serves to improve the damping power of the covering 1.

With the dissipating elements 3 deforming, each main absorbent element 6 is subjected to shear forces substantially parallel to the structure 2, insofar as it is secured both to the dissipating element 3 and to the structure 2. The absorbent elements thus dissipate a large fraction of the energy transmitted by the structure, thereby giving high damping power to the covering 1.

In order to maximize dissipation, it is advantageous for the dissipating elements 3 and the main absorbent elements 6 to be of identical shapes and dimensions, with a dissipating element 3 also covering a main absorbent element 6.

In a variant of the invention shown in FIG. 1, it is possible to envisage further increasing the dissipation power of the covering. This is detrimental to its weight, but can be extremely useful, depending on needs.

The absorbent covering 1 then has secondary absorbent elements 7 possibly constituting an absorbent plate.

Each secondary absorbent element 7, made of an elastic material that gives it high capacity to absorb energy compared with the dissipating elements due to having a large loss angle of at least 10°, is then placed on top of the dissipating element 3 so as to cover it over its entire area and along the length of said dissipating element 3. With reference to FIG. 1, each secondary absorbent element 7 is thus secured to a top face 3" of a dissipating element 3, said top face 3" being opposite from and parallel to its bottom face 3'.

Furthermore, the secondary absorbent elements 7 and the dissipating elements 3 are advantageously of identical shape and of identical dimensions. Each secondary absorbent element 7 may be secured to an absorbent stud 7' secured to the top end 4" of a node 4.

Thus, the assembly comprising the secondary absorbent element 7 and the stud 7' rests on the assembly comprising the node 4 and the dissipating element 3, and is fastened thereto.

As a result, deformation of the dissipating element 3 under the effect of movement of the structure 2 generates forces not only in the main absorbent element 6 associated therewith, but also in a secondary absorbent element 7. The damping power of the covering is thus increased.

This damping power can be maximized when the secondary absorbent elements 7 are visco-constrained i.e. subject to viscous constraint. The covering 1 then comprises a rigid cover plate 8, with a secondary absorbent element 7 thus firstly be disposed between a dissipating element 3 and the cover plate 8, and secondly being secured to the dissipating element 3 and to the cover plate 8.

Figure 2:
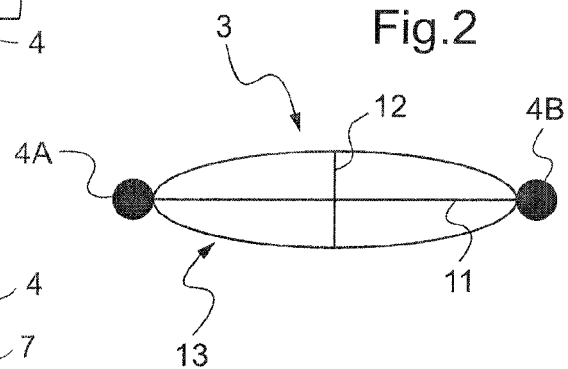
FIG. 2 is a view of a dissipater element in the form of an ellipse.

With reference to FIG. 2, the dissipating elements are advantageously elliptical in shape, however they could have any other shape (bar or rod, lozenge or diamond . . . ) depending on requirements, without going beyond the scope of the invention.

A dissipating element 3 of elliptical shape is then associated with two nodes 4A and 4B. The nodes 4A and 4B are disposed on the intersections between the periphery 13 and the major axis 11 of the ellipse.

From a functional point of view, when the structure 2 is deformed under the effect of vibration, whatever the mode of the stress (traction, bending . . . ), the nodes 4A, 4B move. The effect of this movement of the nodes 4A, 4B is to modify the shape of the dissipating element 3. It is explained below that by shortening and lengthening, dissipating elements 3 of elliptical shape give rise to amplified deformation of the elastic material constituting the main and secondary absorbent elements 6 and 7.

Because of the shape of an ellipse, a small reduction in the length of the major axis 11 leads to a large increase in the length of the minor axis 12. Thus, low levels of stress on the ellipse along the major axis 11 are strongly amplified, leading to a large amount of deformation of the minor axis 12. This effect, multiplied by the number of ellipses in the dissipater mesh, gives the covering of the invention high damping power.

Figure 3:
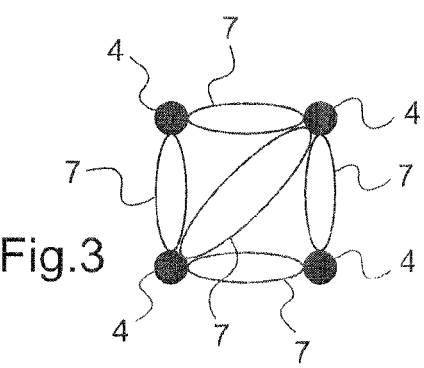
FIG. 3 is a plan view of a dissipater mesh in a first embodiment.

In a first embodiment, described with reference to FIG. 3, the dissipater mesh has a repeated square pattern.

This square pattern has four nodes 4 and four dissipating elements 7 occupying respectively the corners and the sides of the square. In addition, a fifth dissipating element 7 is placed along one of the diagonals of the square.

Figure 4:
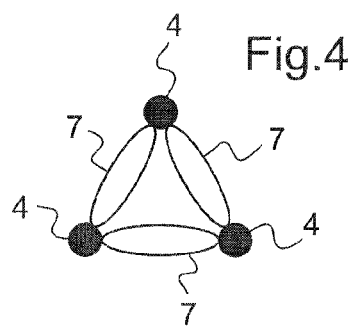
FIG. 4 is a plan view of a dissipater mesh in a second embodiment.

In a second embodiment shown in FIG. 4, the repeated pattern of the dissipater mesh is a triangle. Three nodes 4 and three dissipater elements 7 then occupy respectively the corners and the sides of a triangle.

Depending on the level of stress applied to the structure, one or other of these two embodiments is preferred.

Figure 5:
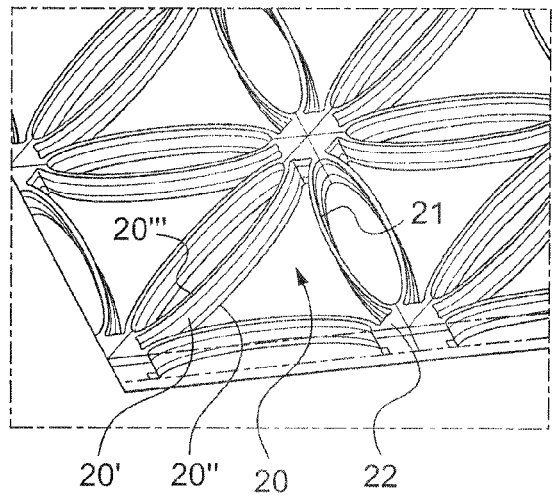
FIG. 5 is an isometric view of a dissipater mesh of a preferred variant of the second embodiment.
Figure 6:
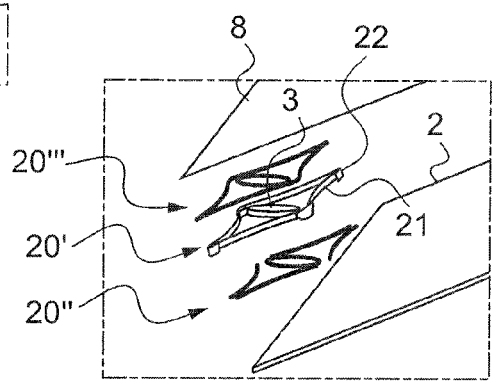
FIG. 6 is a diagrammatic exploded view of a portion of an absorbent covering.

FIGS. 5 and 6 are respectively an isometric view and an exploded view of a preferred variant of the second embodiment.

The dissipater mesh has a repeated triangle pattern. In addition, it is built up from triangular portions 20, each provided with three half-ellipses 21 interconnected by three node fractions 22.

Each half-ellipse 21 corresponds to an ellipse cut in half along its major axis. It should be observed that each half-ellipse 21 is concave with its concave side being on the outside of said triangle.

Furthermore, the nodes 4 are cylindrical in shape. They thus comprise six identical node fractions 22, each fraction occupying a sector of 60°.

More precisely, with reference to FIG. 6, the covering comprises a first triangular portion 20' provided with three half-ellipses, referred to as dissipater ellipses for convenience, each dissipater half-ellipse constituting half of a dissipating element 3, and the three half-ellipses being connected together in pairs by node fractions 22.

In addition, it comprises a second triangular portion 20" provided with three main absorbent half-ellipses, each main absorbent half-ellipse constituting half of a main absorbent element 4. Each main absorbent half-ellipse is then secured to the structure 2, to a dissipater half-ellipse of the first triangular portion 211, and to two node fractions 22.

Finally, the covering comprises a third triangular portion 20''' provided with three secondary absorbent half-ellipses, each secondary absorbent half-ellipse constituting half of a secondary absorbent element. Each secondary absorbent half-ellipse is then secured to the cover plate 8, to a dissipater half-ellipse of the first triangular portion 20', and to two node fractions 22.

Naturally, the present invention can be subjected to numerous variations as to its implementation. Although several embodiments are described above, it will readily be understood that it is not conceivable to identify exhaustively all possible embodiments. It is naturally possible to consider replacing any of the means described by equivalent means without going beyond the scope of the invention.

What is claimed is:

1. An absorbent covering having high damping power, secured on a structure and comprising a dissipater mesh made up of a plurality of dissipating elements and of nodes each having its bottom end secured on said structure wherein said bottom ends of said nodes project from said dissipating elements so as to leave an empty space between the dissipating elements and said structure, said absorbent covering including main absorbent elements arranged in said empty space, each of said main absorbent elements being secured firstly to a bottom face of a said dissipating element and secondly to said structure, the dissipating elements cooperate to form laterally spaced empty spaces therebetween, each laterally spaced empty space not being filled with material.

2. A covering according to claim 1, wherein the dissipating elements are rigid relative to the absorbent elements and are made of a material forming part of the group comprising plastics materials.

3. A covering according to claim 1, wherein the dissipating elements are used in their elastic deformation range.

4. A covering according to claim 1, wherein said main absorbent elements are elastic and are made of a material forming part of the group of materials comprising elastomers.

5. A covering according to claim 1, wherein said main absorbent elements possess high energy absorption capacity relative to the dissipating elements.

6. A covering according to claim 1, wherein said main absorbent elements have a loss angle of at least 10°.

7. A covering according to claim 1, wherein the contact surface of said bottom end is covered with a self-adhesive material.

8. A covering according to claim 1, wherein said dissipater mesh has a repeated square pattern.

9. A covering according to claim 1, wherein said dissipater mesh has a repeated triangle pattern.

10. A covering according to claim 1, wherein at least one dissipating element is shaped in an ellipse.

11. A covering according to claim 10, wherein said ellipse is secured to two nodes disposed at the intersections between its periphery and its major axis.

12. A covering according to claim 10, wherein said dissipater mesh has a repeated triangle pattern, and said dissipater mesh comprises triangular portions each provided with three half-ellipses interconnected by three node fractions, each half-ellipse corresponding to an ellipse cut in half along its major axis.

13. A covering according to claim 12, wherein each half-ellipse of a triangular portion presents a concave side on the outside of said triangular portion.

14. A covering according to claim 12, wherein each node fraction corresponds to one-sixth of a node, said fraction occupying a sector of 60°.

15. An absorbent covering having high damping power, secured on a structure and comprising a dissipater mesh made up of a plurality of dissipating elements and of nodes each having its bottom end secured on said structure wherein said bottom ends of said nodes project from said dissipating elements so as to leave an empty space between each of the dissipating elements and said structure, said absorbent covering including a plurality of main absorbent elements, each of said main absorbent element being arranged in said empty space secured firstly to a bottom face of a respective one of said dissipating elements and secondly to said structure, said absorbent covering including secondary absorbent elements, each secondary absorbent element being arranged on top of one of said dissipating element so as to cover said dissipating element over the length of said dissipating element.

16. A covering according to claim 15, wherein each secondary absorbent element is made from an elastic material that gives it high capacity for absorbing energy compared with the dissipating elements by having a large loss angle of at least 10°.

17. A covering according to claim 15, including a rigid cover plate, said secondary absorbent elements then being arranged between said dissipating elements and said rigid cover plate.

18. A covering according to claim 1, wherein said dissipater mesh is machined as a single piece from a single block of deformable material.

19. A covering according to claim 1, wherein said dissipater mesh is obtained by molding of a block of deformable material as a single piece.

20. An absorbent covering having high damping power, secured on a structure and comprising a dissipater mesh made up of a plurality of dissipating elements and of nodes each having its bottom end secured on said structure wherein said bottom ends of said nodes project from said dissipating elements so as to leave an empty space between the dissipating elements and said structure, said absorbent covering including main absorbent elements arranged in said empty space, each of said main absorbent elements being secured firstly to a bottom face of a said dissipating element and secondly to said structure, wherein said dissipating elements and said main absorbent elements are elliptical in shape, each dissipating element covering a main absorbent element over its entire length.

21. A covering according to claim 15, wherein each secondary absorbent element is secured to a top face of a dissipating element, said top face being opposite from a bottom face that is secured to said main absorbent element.

22. A covering according to claim 15, wherein the dissipating elements are more rigid than the absorbent elements and are made of a material.

* * * * *